US012662131B2

(12) United States Patent
Barth et al.

(10) Patent No.: US 12,662,131 B2
(45) Date of Patent: Jun. 23, 2026

(54) PHYSICAL DRIVER CONDITION DETERMINATION FOR VEHICLE SAFETY

(71) Applicant: Aptiv Technologies AG, Schaffhausen (CH)

(72) Inventors: Alexander Barth, Wermelskirchen (DE); Timo Rehfeld, Cologne (DE)

(73) Assignee: Aptiv Technologies AG, Schaffhausen (CH)

( * ) Notice: Subject to any disclaimer, the term of this patent is extended or adjusted under 35 U.S.C. 154(b) by 0 days.

(21) Appl. No.: 18/800,535

(22) Filed: Aug. 12, 2024

(65) Prior Publication Data

US 2025/0058784 A1     Feb. 20, 2025

(30) Foreign Application Priority Data

Aug. 14, 2023     (EP) ...................................... 23191412

(51) Int. Cl.
*G08B 23/00*         (2006.01)
*B60K 28/06*         (2006.01)
(Continued)

(52) U.S. Cl.
CPC ............. *B60W 40/08* (2013.01); *B60K 28/06* (2013.01); *B60K 35/10* (2024.01); *B60W 2040/0818* (2013.01); *B60W 2420/403* (2013.01); *B60W 2540/18* (2013.01); *B60W 2540/223* (2020.02); *B60W 2540/225* (2020.02); *B60W 2540/24* (2013.01)

(58) Field of Classification Search
CPC ......... B60W 40/08; B60W 2040/0818; B60W 2420/403; B60W 2540/18; B60W 2540/223; B60W 2540/225; B60W 2540/24; B60W 50/12; B60W 2040/0836; B60W 2040/084; B60W 2040/0854;

B60W 2540/215; B60W 40/09; B60W 50/14; B60W 2040/0872; B60W 2040/0881; B60K 28/06; B60K 35/10; B60K 2360/178; B60K 2360/21; B60K 2360/741; B60K 28/066; B60K 35/22; B60K 35/26; B60K 35/28; B60K 28/063; B60Y 2302/05; G06V 20/597
USPC .................... 340/576, 573.1, 574, 575, 425.5
See application file for complete search history.

(56) References Cited

U.S. PATENT DOCUMENTS 9,714,037 B2 * 7/2017 DeRuyck ............. G06V 20/597
11,801,845 B2 * 10/2023 An .......................... G06V 20/59
(Continued)

FOREIGN PATENT DOCUMENTS

WO          2023274832 A1      1/2023

OTHER PUBLICATIONS

Extended European Search Report for EP23191412.8 dated Jan. 22, 2024, 8 pages.
Miyajima, Chiyomi, et al. "Driver risk evaluation based on acceleration, deceleration, and steering behavior." 2011 IEEE international conference on acoustics, speech and signal processing (ICASSP). IEEE, 2011, 4 pages.
(Continued)

*Primary Examiner* — Anh V La
(74) *Attorney, Agent, or Firm* — Miller Johnson

(57)          ABSTRACT
A computer-implemented method for determining a physical condition of a driver of a vehicle. The method includes receiving at least one image taken by a vehicle camera. The image shows at least a part of the driver and a sensor to be operated by the driver to determine the physical condition. The method includes determining, based on the image, if the sensor is operated by the driver.

14 Claims, 11 Drawing Sheets

(51) Int. Cl.
    *B60K 35/10*       (2024.01)
    *B60W 40/08*     (2012.01)

(56)              References Cited

U.S. PATENT DOCUMENTS

| 2016/0272214 A1* | 9/2016 | Chen ........................ B60R 25/10 |
| 2020/0122731 A1 | 4/2020 | Vanhelle |
| 2022/0032923 A1* | 2/2022 | Park ......................... A61B 5/18 |
| 2022/0051038 A1* | 2/2022 | Coimbra De Andrade ................. B60W 40/09 |
| 2023/0004745 A1* | 1/2023 | Fulop ........................ G06T 3/40 |
| 2023/0294514 A1* | 9/2023 | Mohanty ............ A61B 5/14546 180/272 |

OTHER PUBLICATIONS

Jon Brodkin, "NTSB wants alcohol detection systems installed in all new cars in US," ARSTechnica, Sep. 21, 2022, 9 pages, (last accessed Aug. 7, 2024 at: https://arstechnica.com/tech-policy/2022/09/ntsb-wants-alcohol-detection-systems-installed-in-all-new-cars-in-us/).
Wikipedia, "Ignition interlock device," 12 pages, https://en.wikipedia.org/wiki/Ignition_interlock_device; last accessed Aug. 7, 2024.
Wikipedia, "Drunk driving in the United States," 24 pages, https://en.wikipedia.org/wiki/Drunk_driving_in_the_United_States; last accessed Aug. 7, 2024.

* cited by examiner

PHYSICAL DRIVER CONDITION DETERMINATION FOR VEHICLE SAFETY

CROSS-REFERENCE TO RELATED APPLICATIONS

This application claims priority to EP 23 191 412 filed Aug. 14, 2023, the entire disclosure of which is incorporated by reference.

FIELD

The present disclosure generally relates to safety improvements for vehicles and, in particular, to methods and systems of controlling vehicle safety measures on the basis of determining a physical condition of a vehicle driver.

BACKGROUND

Smart vehicles, such as smart cars, smart busses, and the like, are on their way to significantly improve the safety of passengers. Such smart vehicles may be equipped with onboard cameras and may be capable of capturing images of the vehicle's interior. Those images can then be used, sometimes in combination with other sensors, for different safety related tasks.

Safety tasks in a vehicle relate to controlling safety measures, such as airbag or seatbelt deployment, door or windows locks and the like. In modern smart cars, these safety measures can be based on person detection and classification. Person detection and classification may therefore play an important role in future vehicles, for example, in seat occupancy detection. Seat occupancy detection is applied to determine whether or not a person is located on a seat. However, such a basic detection whether or not a person is located on a seat is not enough for reliably controlling all safety measures in a reliable way.

Hence, there is a need for an improved system for controlling of safety measures.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In this context, methods, systems and computer program products are presented as defined by the independent claims.

More specifically, a computer-implemented method for determining a physical condition of a driver of a vehicle is provided. The method comprising receiving a least one image taken by a vehicle camera, the image showing at least a part of the driver and a sensor to be operated by the driver to determine the physical condition, and determining, based on the image, if the sensor is operated by the driver.

Optionally, determining that the sensor is operated by the driver comprises identifying the driver among multiple persons in the vehicle including classifying activities of the multiple persons, and assigning detected body parts to a respective one of the multiple persons on vehicle seats, and providing a unique identifier for the respective one of the persons.

Optionally, determining that the sensor is operated by the driver comprises localizing and tracking at least one hand of the driver, and determining that the sensor is operated by a hand of the driver.

Optionally, localizing and tracking at least one hand of the driver comprises, based on the at least one image: tracking of bodies shown in the image, tracking of hands shown in the image, and assigning, based on the tracked bodies and hands, the at least one hand to the driver.

Optionally, determining that the sensor is operated by a hand of the driver comprises, based on the at least one image: localizing the sensor, and determining a proximity of the hand of the driver to the sensor.

Optionally, the method further comprises determining that the sensor is operated by a person other than the driver.

Optionally, the method further comprises: generating a warning signal, and/or triggering a control action to block or stop operation of the vehicle, and the control action comprises effecting a safe stop of the vehicle, and/or prompting the driver to confirm current physical driving abilities.

Optionally, the method further comprises determining, by the sensor operated by the driver, the physical condition of the driver.

Optionally, determining the physical condition of the driver further comprises determining, based on the at least one image, at least one of eye states of the driver, body movements of the driver, hand operations of the driver, object detection in the vicinity of the driver, facial expressions of the driver.

Optionally, body movements of the drivers include drinking movements and/or smoking movements; and object detection in the vicinity of the driver comprises detecting a vessel potentially containing liquid and/or detecting smoking products.

Optionally, determining the physical condition of the driver further comprises analyzing driving behavior including at least one of lane position, driving meandering, steering wheel dynamics, and acceleration/deceleration dynamics.

Optionally, the method is performed before vehicle start and comprises blocking the vehicle from being operated until usage of the sensor by the driver has been confirmed and sensor output has confirmed that the physical condition of the driver meets given conditions to operate the vehicle.

Optionally, the method is performed during operation of the vehicle and comprises in response to determining that the sensor is operated by the driver and sensor output indicating that the physical condition of the driver is likely ineligible for driving, outputting a warning signal, Optionally, the sensor comprises at least one of a breath analyzer, a finger contact sensor, a pulse measurement device, a blood pressure device, an air analyzer, and a blood analyzer.

Another aspect concerns a system of controlling one or more vehicle safety measures, the system implementing the methods as described herein.

A further aspect concerns a vehicle comprising a camera for capturing one or more images, and the system for controlling one or more vehicle safety measures as described herein.

A final aspect concerns a computer program product comprising instructions, which, when executed on a computer, cause the computer to perform the methods as described herein.

These and other objects, embodiments and advantages will become readily apparent to those skilled in the art from the following detailed description of the embodiments having reference to the attached figures, the disclosure not being limited to any particular embodiments.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The foregoing and further objects, features and advantages of the present subject matter will become apparent from the following description of exemplary embodiments with reference to the accompanying drawings, wherein like numerals are used to represent like elements, in which.

In the drawings, reference numbers may be reused to identify similar and/or identical elements.

DETAILED DESCRIPTION

The present disclosure relates to methods and systems for controlling vehicle safety measures by determining a physical condition of a vehicle driver condition. Vehicles fully or partially driven by human drivers are subject to safety concerns if the human driver is in a physical condition that may compromise driving abilities. For example, driving under influence is a frequent source of critical accidents. There are several initiatives to prevent an intoxicated driver from operating a vehicle, i.e. enhance safety by not allowing to operate a car when driver is drunk, using Cannabis, or otherwise intoxicated. Hence, determination of the physical condition of the driver plays a significant role for ensuring driving and vehicle safety.

To address these concerns, a vehicle may be equipped with one or more sensing devices (briefly referred herein as sensors) which may be capable to determine one or more factors of the physical condition of the driver. For example, in the US, subjects that have been convicted of intoxicated driving can be required to install an ignition interlock device, that only allows starting the car after e.g. using a breath analyzer, showing the alcohol level is below the legal threshold. While such sensors may output relatively reliable indications of the current physical condition of the driver, the sensors do not ensure that they are actually operated by the driver as opposed to another person such as a passenger. Hence, a positive indication from the sensor does not necessarily mean that the driver's current physical condition allows for driving.

Furthermore, using sensors such as alcohol breath analyzers linked to the vehicle ignition may block the vehicle from being operated before driving, but does not necessarily monitor the intoxication status of the driver during the ride.

Other approaches use, for example, odor sensors that analyze the air in the cabin for specific gases linked to intoxication. However, these methods cannot distinguish the intoxication status of driver and passengers. For example, an intoxicated passenger could also trigger an alert, while the driver is sober.

Figure 1:
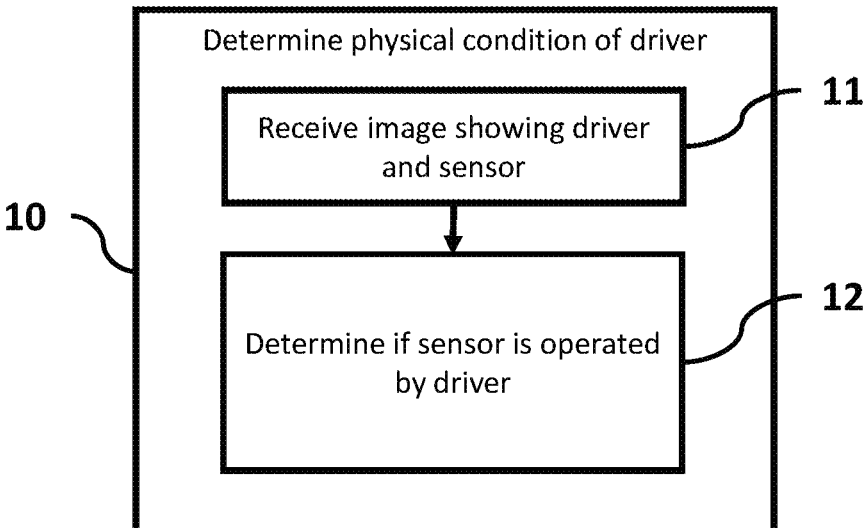
FIG. 1 shows a high-level version of the present methodologies.

Against this background, this disclosure presents a solution for safety measure control based on typically existing information available in a vehicle, which allows an improved determination 10 of the physical condition of the driver. In accordance with the high-level flow-chart of FIG. 1, the present disclosure utilizes image data provided by an onboard camera of the vehicle. While the following description refers to a camera, this also includes multiple cameras and utilizing images taken and provided by multiple cameras of the vehicle.

The present methodologies are implemented by a computerized platform (cf. FIG. 15), typically an electronic control unit (ECU) in a vehicle. The methodologies can be utilized for any type of vehicle which is, at least to some extent, operated by a human driver, vehicles, such as cars (including taxis), trucks busses, trains, ships, airplanes, and the like.

At a general level, the computerized platform receives 11 image data representing an image taken by the onboard camera such as a cabin camera. The camera is typically built in in the vehicle already for other control purposes. For example, modern cars are typically equipped with a set of multiple cameras forming an onboard camera system. The cameras, which may include one or more of color or monochrome cameras, infrared cameras, depth cameras, and heat cameras, provide images of the vehicle's interior to internal components of the vehicle. The images may be taken based on defined periodic or non-periodic time intervals and/or in response to another triggering event, e.g., opening a door, interacting with a multi-media system of the vehicle, using a voice command, or the like. The images taken may then be used by a plurality of internal systems for controlling safety means as herein described but also for entertainment and comfort use cases. The computerized platform realizing the present mechanisms may be hosted by the camera itself or may be communicatively coupled with the camera.

Images of the vehicle's interior may comprise full images showing the whole interior. Alternatively, the images may depict only a partly region of the interior, e.g., one front seat, one or more rear seats, a door region, and such. If a camera captures the whole interior, the images may be image crops that have been extracted from one or more raw images for one or more regions in the vehicle. The image crops may be preprocessed, e.g. by removing the impact of a sensor CFA (Color Filter Array) pattern or by performing applying additional enhancements/pixel processing.

The image received at box 11 shows at least a portion of the driver as well as at least a portion of the sensor. The computerized platform processes the received image to determine 12 if the sensor is operated by the driver as opposed to any other non-driving person. To facilitate determination 12, the system is able to localize and track hands, mouth, eyes, and objects. The system can further classify activities of passengers, assign detected body parts to persons and seats, and provide a unique identifier for a given passenger and, in particular, the driver of the vehicle. Generally, determination 12 may be performed before starting operation of the vehicle (cf. below, e.g. FIGS. 8-10) and during operation of the car (e.g. FIG. 12-13), FIG. 1 encompasses both phases.

Figure 2:
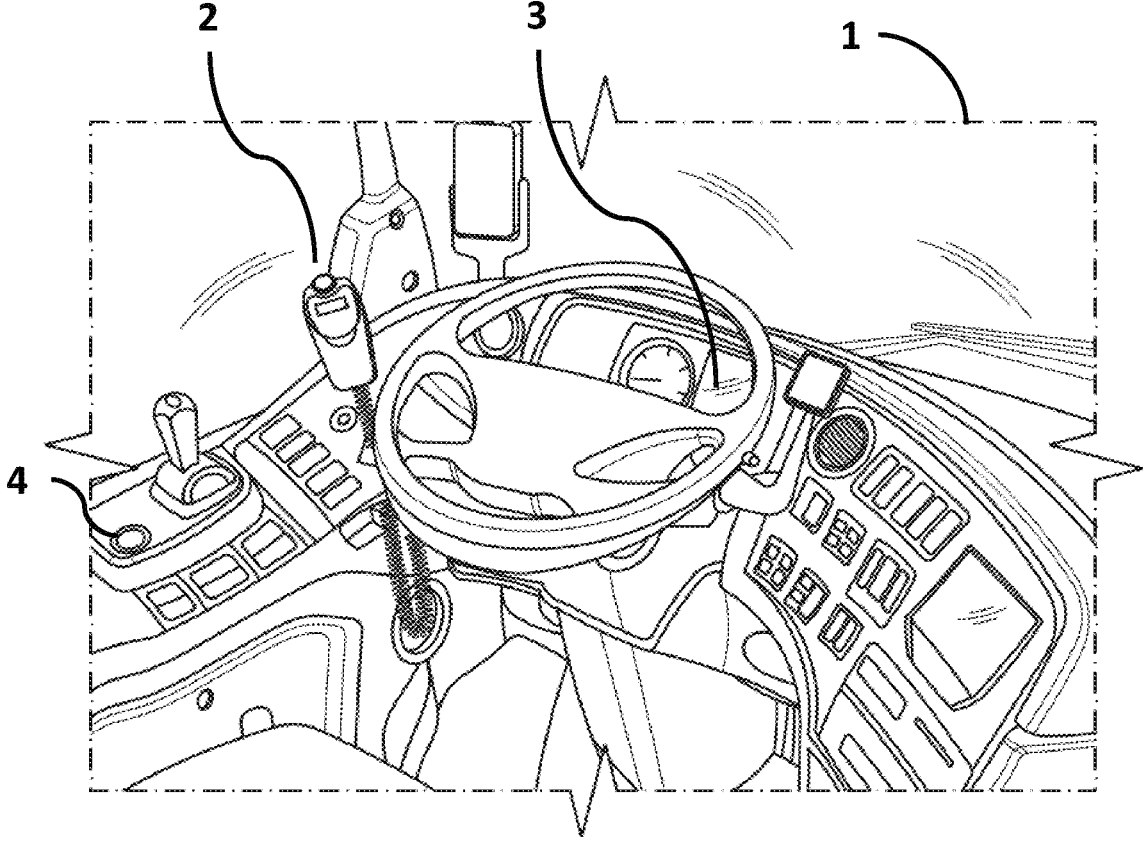
FIG. 2 visualizes an exemplary vehicle cabin.

A non-limiting exemplary vehicle cabin 1 is visualized by FIG. 2. The vehicle cabin 1 features various standard controls and equipment enabling the driver to operate the vehicle, such as a steering wheel, a gear lever, smartphone mounting, a display 3, a vehicle ignition button 4, and so on, as well as a sensor 2. The sensor 2 may be any analyzing device which examines one or more factors indicative of the physical driving condition of the driver. Non-limiting examples of sensor devices 2 are breath analyzers, finger contact sensors, pulse measurement devices, blood pressure devices, air analyzers, blood analyzers (cf. also FIG. 7).

Figure 3:
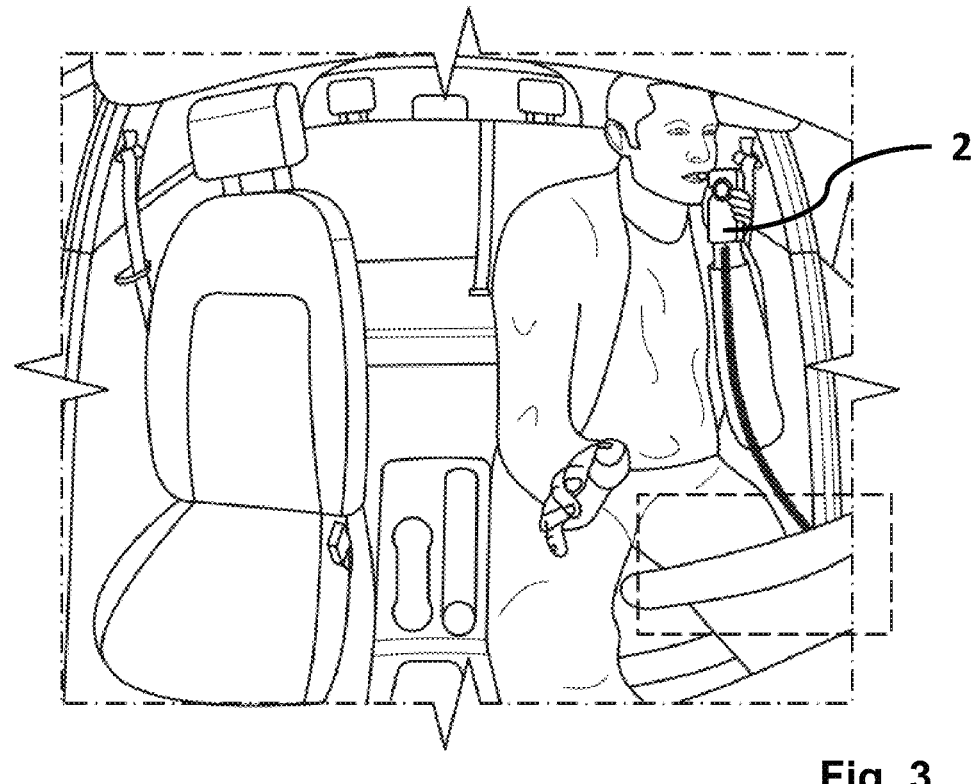
FIG. 3 shows an exemplary image of the vehicle cabin taken by a vehicle camera.

Typically, the sensor 2 is operated by the driver in a manual manner. As shown by the exemplary situation of FIG. 3, the driver may grab the sensor 2 with one of his/her hands and operate the sensor 2 (e.g. by blowing a breathing air sample into a mouthpiece). The sensor then performs the respective analysis, e.g. analyzing the concentration of ethanol in the breathing air, and outputs a result signal. The result signal is fed into a vehicle control system. If the result signal indicates an affirmative result (e.g. no ethanol concentration in the breathing air, or ethanol concentration below a given threshold), the driver is allowed to operate the vehicle. Otherwise, operation of the vehicle may be blocked.

Figure 4:
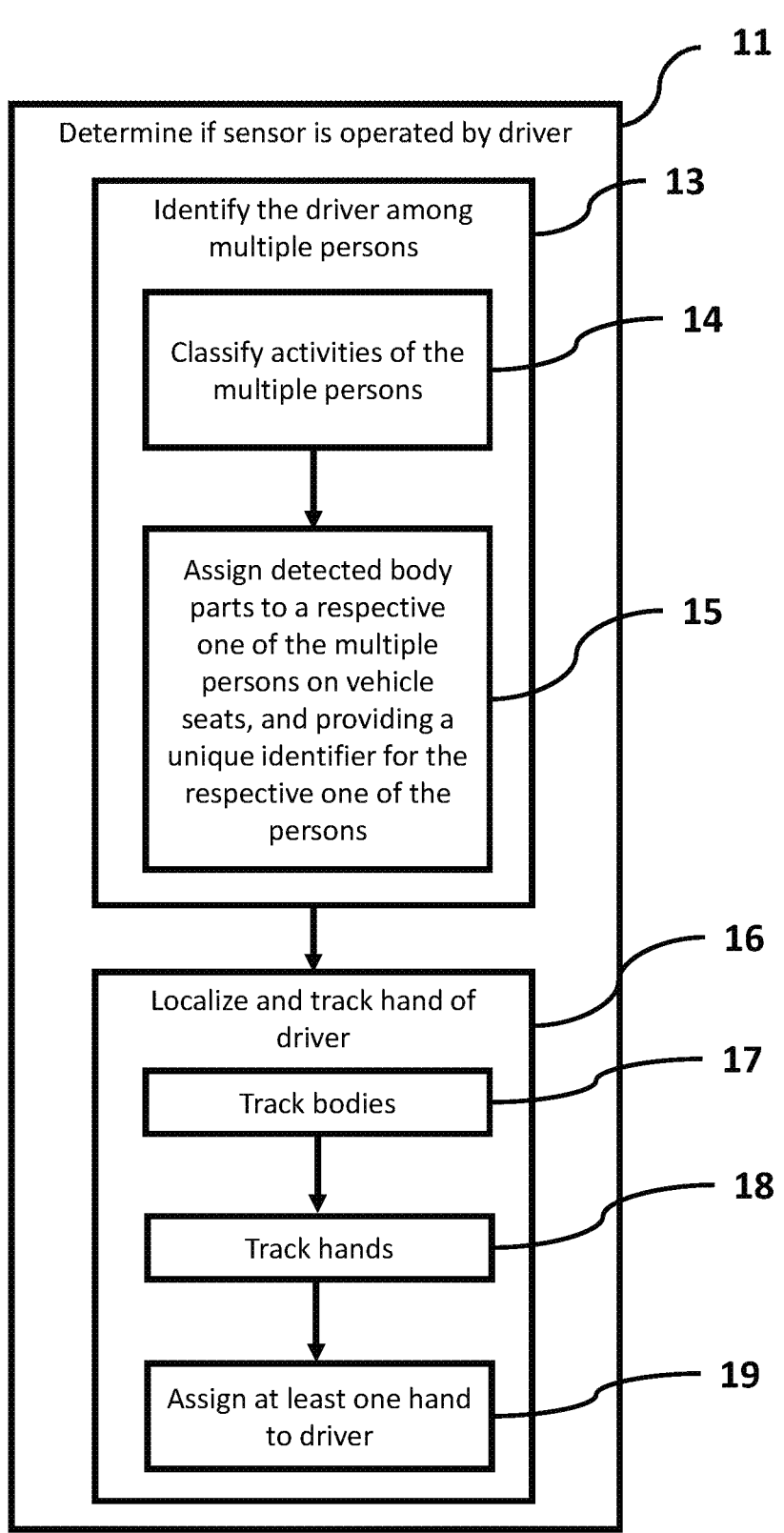
FIGS. 4-7 provide more detailed aspects of the present functionalities.
Figure 5:
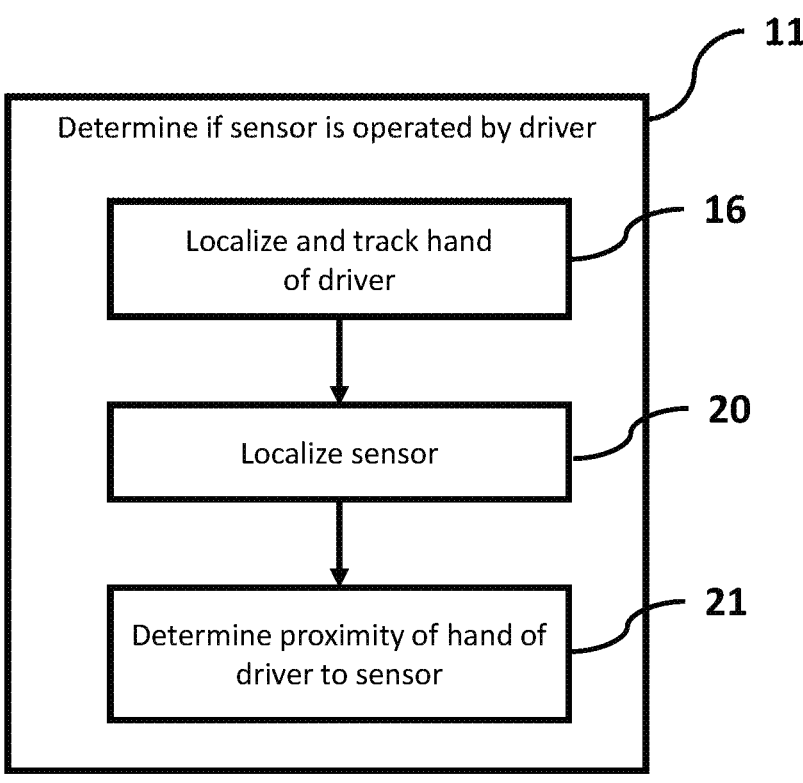
Figure 6:
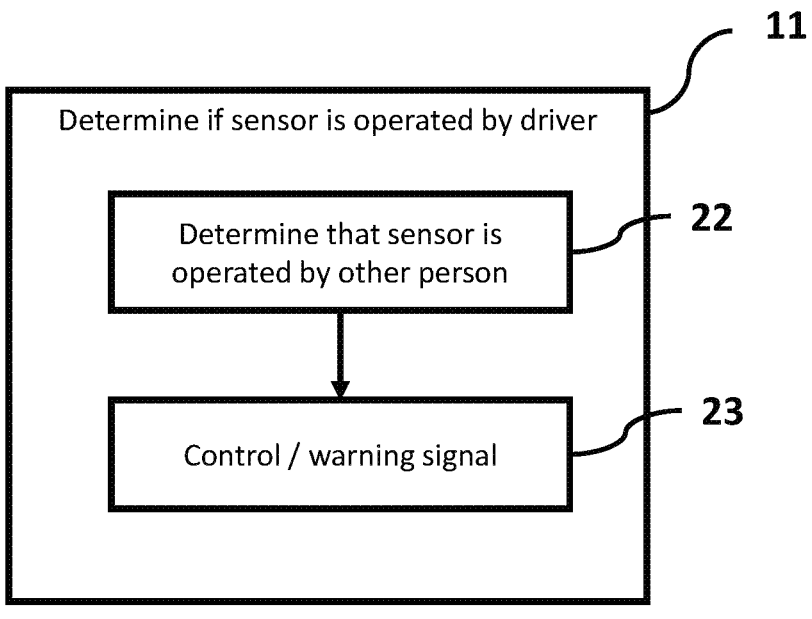

In some embodiments, the functionality to determine if the sensor 2 is operated by driver includes a number of sub-functionalities (e.g. FIGS. 4, 5, 6). Some of these sub-functionalities relates to identifying the driver among a plurality of people in or around the vehicle. For example, the driver of the vehicle may sit on the driving seat, while a non-driving passenger of the vehicle may sit on another seat next to the driving seat or behind the driving seat, or may stand next to the vehicle at the driver's vehicle door. The image received by the computerized platform may show both, the driver and the non-driving passenger or person. The sub-functionalities for identifying the driver use image processing and analysis techniques to identify which of the two persons in the image is the driver who is supposed to operate the sensor 2.

In this respect, with reference to FIG. 4, determining 11 if the sensor is operated by the driver includes a sub-functionality to identify 13 the driver among multiple persons based on the image. In turn, identifying 13 the driver among multiple persons in or at the vehicle may include classifying 14 activities of the multiple persons shown in the image received from the camera and assigning 15 detected body parts to a respective one of the multiple persons on vehicle seats, and providing a unique identifier for the respective one of the persons. Identifying 13 the driver may re-use seat occupancy mechanisms which are already present in the vehicle and already utilized for other control purposes, such as determining a seat occupancy state for the seats in the vehicle to control seat belt states and airbag pressure. A seat-based classifier module may use a fixed bounding box around a seat as input. The seat occupancy classification may also comprise one or more object-based modules such as an object detector, for example, using a YOLO-based object detection algorithm, a body key point classifier, and/or a face detector. The classifier may also be arranged to detect a person outside the vehicle, e.g. a person standing next to the driver door and still be visible in the image.

With continued reference to FIG. 4, a further sub-functionality relates to localizing and tracking 16 the hand of the driver. In some embodiments, localizing and tracking 16 the hand of the driver may include tracking 17 bodies shown in the image, tracking 18 hands shown in the image, and assign 19 at least one of the hands tracked in the image to the driver. For example, body tracking 17 and hand tracking 18 may utilize bounding boxes and key points detected in the image and representing given hand and body points or elements. Assigning 19 a hand to the driver may utilize proximity analyses between hand and body points.

For example, a distance between a wrist body key point and a hand bounding box is determined. For example, a minimum distance of the wrist body key point and the nearest edge of the hand bounding box or the distance of the wrist body key point to the center of the hand bounding box may be determined. If the distance between the wrist body key point and the hand bounding box is smaller than a threshold, the hand is assigned to the person relating to the wrist body key point. In order to handle cases, in which a bounding box of a hand is near to multiple wrist body key points, e.g., of multiple persons or to the right and left wrist body key points of one person, the hand may be assigned when a further criterion is met. For example, the hand may be assigned to a person if the distance of the hand bounding box and the respective wrist body key point is the smallest distance the hand bounding box to all wrist body key points. Alternatively, other criteria may be applied. For example, the hand may be assigned to that person's wrist key point that had over a period of time, e.g., over multiple images taken by the cabin board camera 3, the averaged nearest distance to the hand bounding box.

In some embodiments, localizing and tracking one or more hands 18 may also utilize key points on the hand, e.g. a hand joints or finger tips (hand skeleton). Based on detected hand key points, a hand pose may be classified, e.g. as "open hand", "hand grabbing something", "hand holding object", "hand operating sensor", "hand performing a gesture", and so on. This classification may be performed on an image crop derived from the hand bounding box, or on the hand skeleton.

In some embodiments, the aforementioned sub-functionalities may then be further utilized. As visualized by FIG. 5, in some embodiments, once at least one of the hands of the driver is localized and tracked 16 in the image, a further sub-functionality may localize 20 the sensor 2 in the image and then compare the position of the diver's hand and the sensor in order to determine 21 a proximity of the driver's hand to the sensor. The determined proximity of the driver's hand to the sensor may be indicative of whether or not it is the driver that operates the sensor 2. Additional information is given further below with reference to FIG. 10. In some embodiments, additionally or alternatively, the position of the sensor may be determined outside the present system, e.g. as the position of the sensor may be known from other sources. For example, the sensor may be integrated in the vehicle cabin (e.g. form a part of the ignition button) and, therefore, the fixed location of the sensor may be known and retrievable from a vehicle-specific configuration file stored in the memory of the vehicle or an external memory. Hence, localizing 20 the sensor may also be implemented by retrieving a sensor position from an external source.

The outcome of the determination 12 if the driver operated the sensor can be twofold: either it is confirmed with sufficient likelihood that the sensor was operated by the driver or the determination 12 yields that the sensor was rather operated by another person. FIG. 6 refers to the latter case, i.e. that it is determined 22 that the sensor 2 was actually operated by another person than the driver. In this event, the system may trigger a suitable action, such as outputting 23 a warning signal and/or a control signal.

The warning signal may be an audio signal, a visual signal, or an audio-visual signal. For example, a control light may be activated using a display of the vehicle and/or a warning tone is played via a loudspeaker in the vehicle cabin. If a smartphone of the driver is communicatively coupled to the control system of the vehicle, the warning signal may also be transmitted to the smartphone and output to the driver by the smartphone.

The control signal may generally prevent the vehicle from driving (before drive) or increase the safety level of the vehicle operation during drive. For example, the control signal may block the engine ignition of the vehicle, activate a parking brake of the vehicle, block a gear lever of the vehicle to remain in the parking state, force the vehicle to break, e.g. to perform an automated safe stop if the vehicle is moving, etc. In some embodiments, the control signal may enable or adjust certain vehicle control functions which are executed e.g. by an Advanced Driver Assistance System (ADAS). For example, the control signal may activate a lane keeping assistant, increase a safety distance to a lead vehicle, etc. The control signal may be output in addition to the warning signal. For example, while the warning function is active to prompt the driver for a manual safe stop, the control function may activate additional driving assistants to increase the safety level during vehicle drive until the manual safe stop has been effected. The warning signal and/or the control signal may be issued before start/drive of the vehicle and during drive of the vehicle, as also discussed further below.

Figure 7:
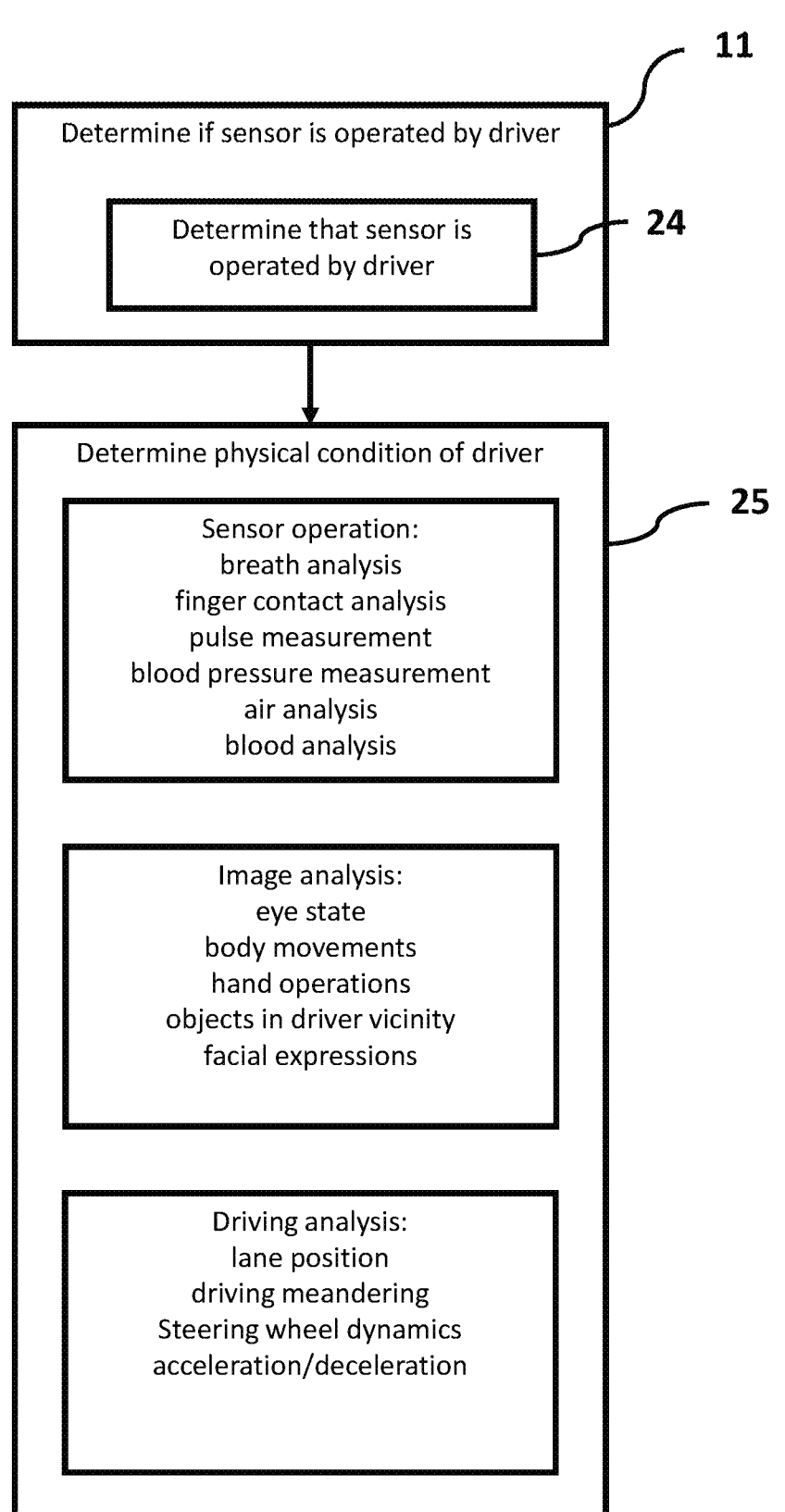

The affirmative situation, i.e. a determination 24 that the sensor was actually operated by the driver, is presented by FIG. 7. In this event, the output of the sensor 2 is processed to determine whether the physical condition of the driver allows for driving. The sensor output may be one, but not the only data for the assessment of the driver's physical condition. Depending on the type of the sensor 2, the sensor may measure or determine different physical factors. For example, the sensor 2 may perform at least one of a breath analysis, a finger contact analysis, a pulse measurement, a blood pressure measurement, an air analysis, a blood analysis. Any particular type and functionality as well as performance, reliability, and particularities of the output of the sensor 2 are encompassed as the methodologies described herein are universal for all sensor types as long as the sensor is to operated by at least a hand of the driver.

In addition to the analysis feedback from the sensor 2, in some embodiments, the physical condition of the identified driver may also be assessed using further data. For example, the one or more images received on which the sensor operation determination 12 has been performed, may also be processed and analyzed to supplementary determine the physical condition of the driver. For example, image analysis may include at least one of an eye state analysis, a body movements analysis, a hand operations analysis, an analysis of objects in driver vicinity, a facial expressions analysis. Such analyses may utilize neural networks being trained to detect certain objects, hand poses, body movements, etc. in images.

In some embodiments, still further data may be used in order to determine the physical condition of the identified driver, again using image data and/or beyond image data taken by the vehicle camera system. For example, data available from monitoring a current operating state of the vehicle and/or the driving process of the vehicle may be analyzed. Such analysis may include, for example, at least one of a driving lane position analysis, a driving meandering analysis, a steering wheel dynamics analysis, an acceleration/deceleration analysis.

Figure 8:
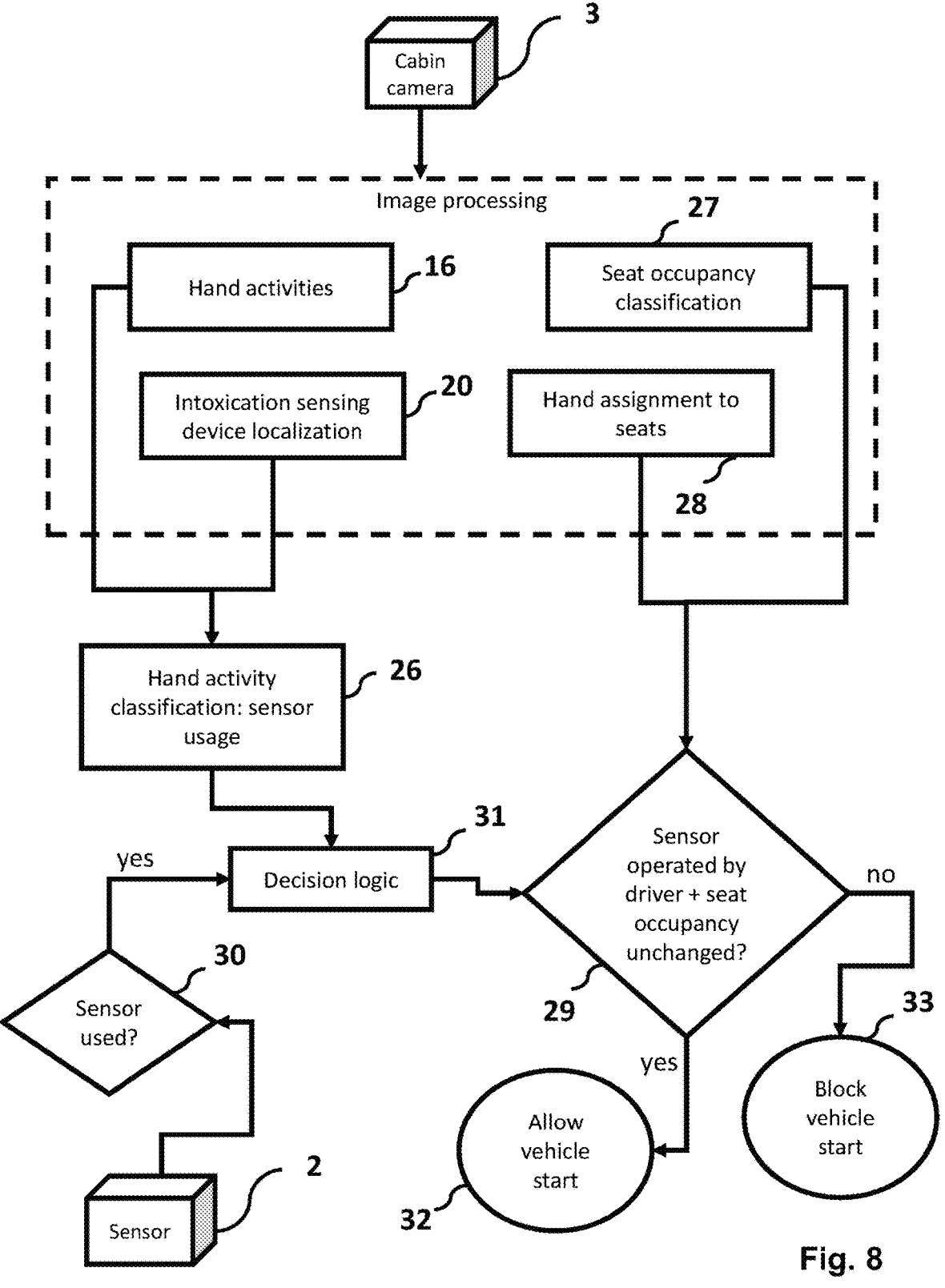
FIGS. 8 and 9 visualize functionalities utilized before vehicle start.
Figure 15:
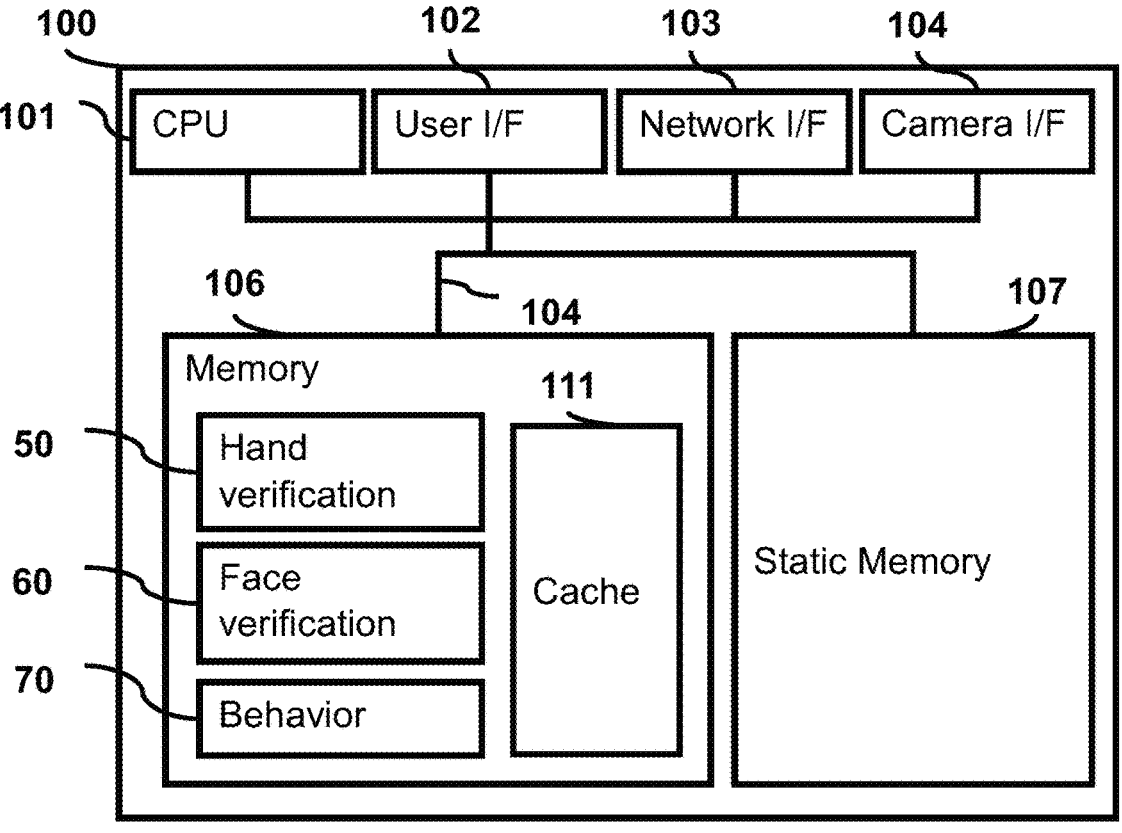
FIG. 15 is diagrammatic representation of a computing system implementing the functionalities described herein.

FIG. 8 shows an exemplary system for realizing the present methodologies at a functional level of abstraction. The system comprises a sensing element (sensor 2) to determine one or more factors of the physical condition of the driver, such as a level of intoxication (e.g. a breath analyzer) that is to be operated by the driver by way of at least some interaction with the hands of the driver. The system also comprises an imaging system such as a cabin camera 3, which takes images of the vehicle interior. The activities and functionalities shown by FIG. 8 may be performed by a computerized platform (FIG. 15). The computerized platform receives the image and has image processing functionalities to detect and track 16 hands shown in the image, detect objects and, in particular, localize 20 the sensor 2 (being one of the detectable objects) in the image data, and combine the results of the classification 16 of hand activities and sensor localization 20 in particular to determine 26 that the tracked hand has actually operated the sensor 2.

The image processing functionalities further include a module for seat occupancy classification 27 and a module for hand-seat assignment 28. The occupancy classification 27 is, for example, arranged to determine whether the driver seat is occupied by a person, to classify the age group of the driver to distinguish from children, and to detect changes of the seat occupancy state, e.g. seat changes of a person or between persons in the vehicle. The hand-seat assignment 28 may utilize functionalities described above with reference to FIG. 4, such as the assignment 15 of detected body parts to a respective person on vehicle seat and the assignment 19 of at least one hand to the driver.

The results of the seat occupancy classification 27 and the hand assignment to seats 28 are provided to a determination logic 29 which eventually determines if the sensor was operated by the driver and the seat occupancy was unchanged in the meantime.

The logic of FIG. 8 may also take into account a signal from the sensor 2 indicating that the sensor 2 was actually (and properly) used. If such "sensor operated" signal is noticed (box 30, "yes"), e.g. by a sensor operating monitoring module (which may be part of the sensor 2 itself), this is propagated to a decision logic 31 which produces a fused signal to the determination logic 29 to indicate that the sensor 2 was now actually operated. Otherwise, the logic loops back (not shown in FIG. 8) until a sensor operation signal is detected.

If applied in a vehicle start scenario, the determination logic 29 decides whether or not vehicle start will be allowed. This decision combines the information from modules 26, 27, 28 as well as the trigger that the sensor was actually operated (30, "yes"). In other words, if it is determined that the hand using the sensor originates from the person that sits on the driver seat and no change in driver seat occupancy in the meantime since the last seat occupancy classification has been determined (meaning that the person occupying the driver seat remains to be the driver of the vehicle), the vehicle will generally be allowed 32 to start (unless the sensor result indicates that the physical condition of the driver is ineligible for driving, which is not reflected in FIG. 8). Otherwise, if it is determined that the sensor was operated by a hand that does not belong to the person on the driving seat and/or the person who was sitting on the driving seat has changed the seat or has left the vehicle, the vehicle start is blocked 33.

Figure 9:
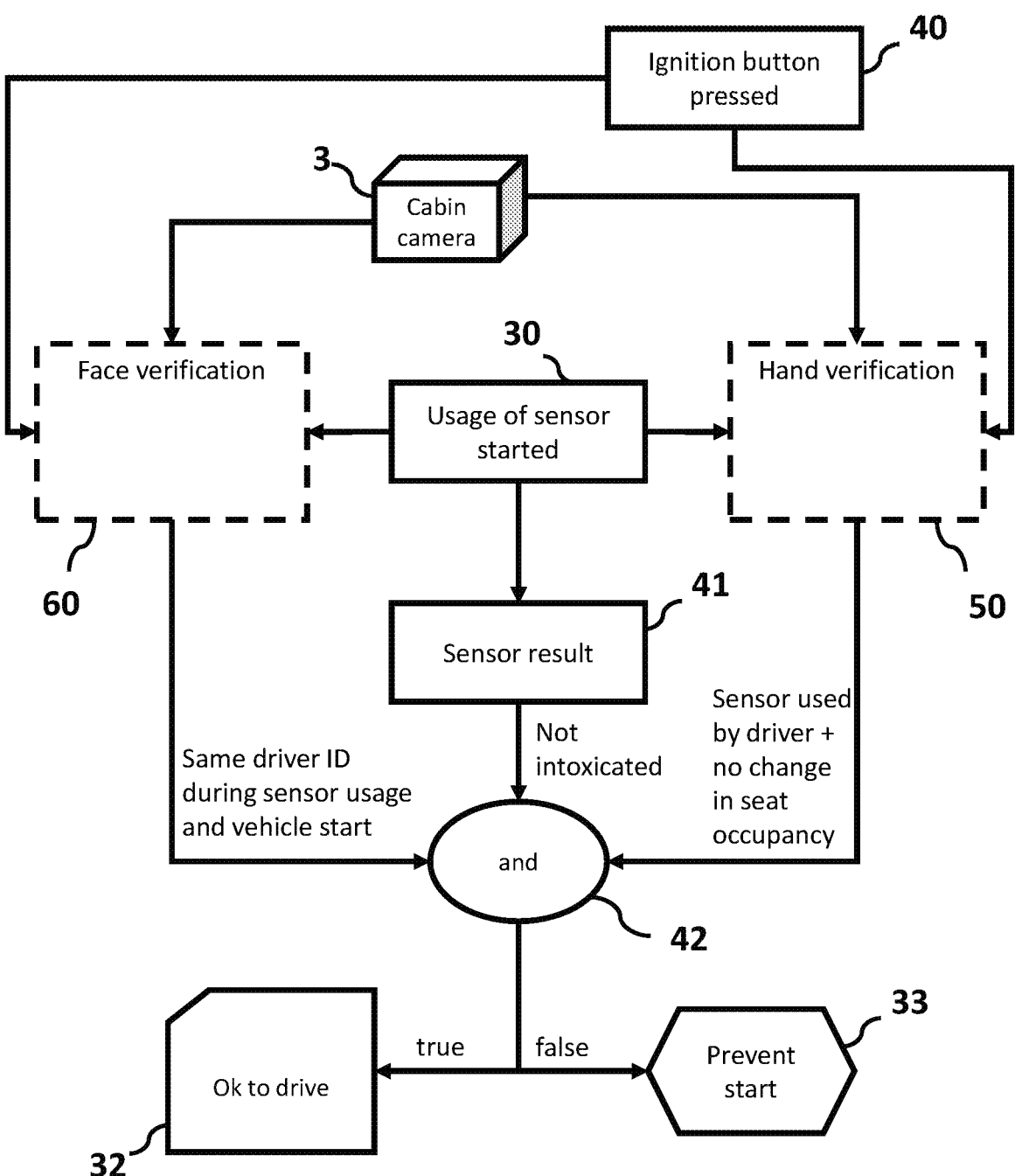
Figures 10, 11:
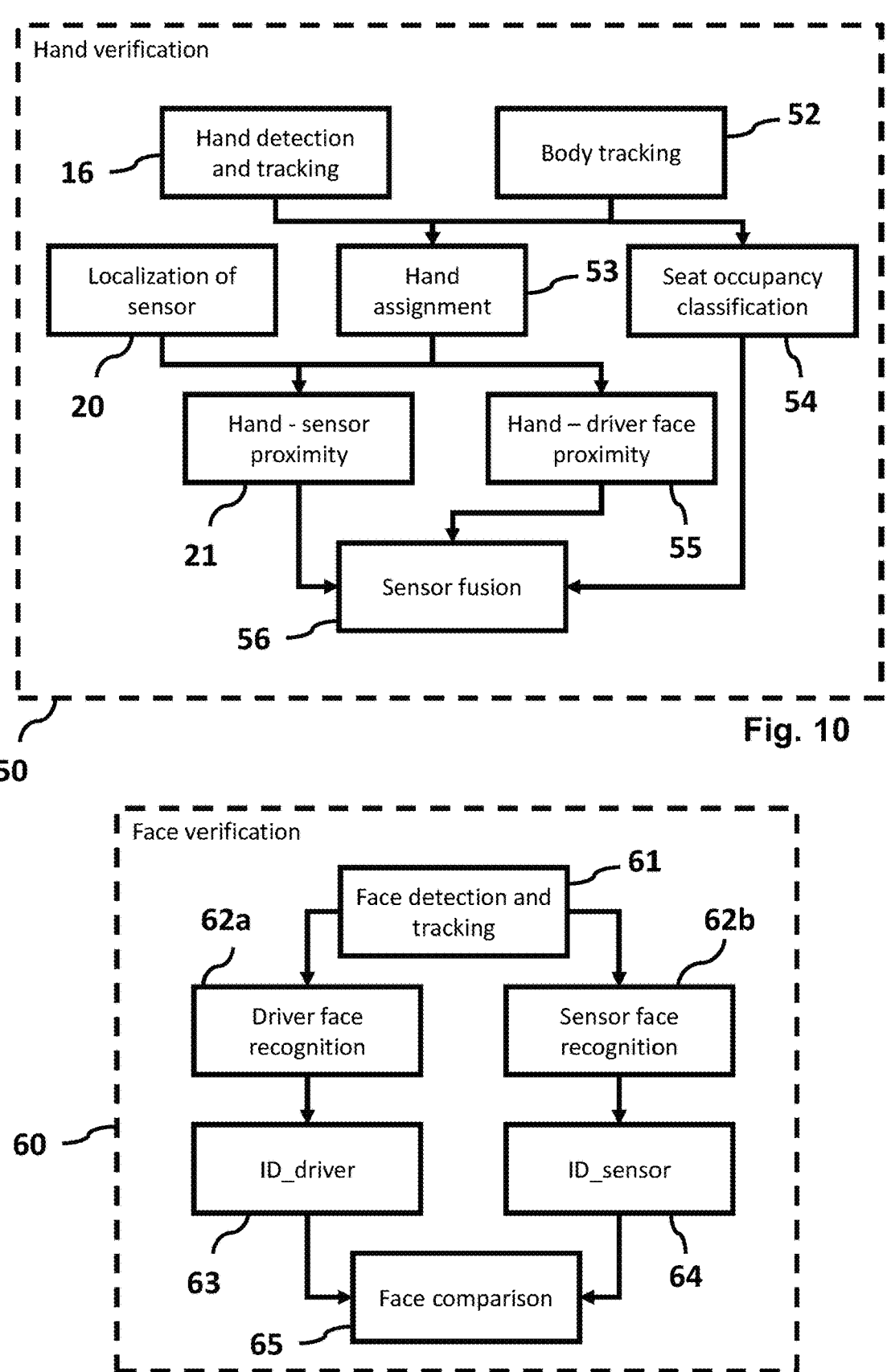
FIGS. 10 and 11 provide implementation aspects for hand and face verification.

FIGS. 9 to 11 show a more detailed implementation example of a system for determining if the driver has operated the sensor 2 before vehicle start. Generally, the implementation example of FIG. 9 utilizes hand verification, i.e. detecting a hand of the driver in the received image and determine if the hand of the driver operates the sensor 2 (aspects of which have already described above). As an optional addition, the implementation example may also employ face verification techniques and determine if the driver operates the sensor 2 by analyzing the face of the driver. As shown by FIG. 9, both verification techniques, hand verification and face verification, may be combined. In a variation of the example of FIG. 9, the hand verification is utilized instead of face verification as sensor operation determination based on hand verification addresses a potential privacy issues with capturing biometrics of a person such as the driver. Hand tracking is a way to overcome the privacy issue as no sensitive information needs to be acquired and processed.

The system of FIG. 9 may be triggered by a signal 40 indicating that the vehicle is to be started, e.g. that an ignition button 4 of the vehicle has been pressed. An additional trigger may be given by a signal 30 indicating that the usage of the sensor has been started, as already described above with reference to FIG. 8.

Generally, the functionalities of the system of FIG. 9 process one or multiple images taken by the cabin camera 3. In some embodiments, multiple images of the vehicle cabin are processed. In some embodiments, the system processes a continuous stream of image frames periodically taken by the cabin camera 3 (e.g. every 100 milliseconds) for at least a period of time.

In some embodiments, image processing activities for the purposes described herein are triggered by a vehicle starting signal, e.g. by a signal 40 indicating that a vehicle ignition button 4 has been pressed. The functionalities of FIG. 9 are then executed in a period of time after ignition button pressed signal 40. A further trigger may be given by a signal 30 indicating that the sensor 2 has started to be operated or used, as already described above with reference to FIG. 8. As long as signal 30 and/or signal 40 are not received, the hand verification 50 and/or the face verification 60 may remain in a stand-by or power-saving state.

After having been triggered by the ignition button pressed signal 40, hand verification 50 and/or face verification 60 input(s) one or more images from the cabin camera 3. Generally, the hand verification 50 determines by analyzing the one or more images for a location of the driver's hand relative to the sensor 2 in order to determine whether or not the sensor is actually operated by the driver. The hand verification 50 then outputs a signal indicating if the sensor has been used by the driver and not change in seat occupancy has been noticed. In addition, in some embodiments, the face verification 60 may analyze the one or more images for the face belonging to the driver and for the face which operates the sensor 2. Both faces are given an identification. If both face identifications are determined to correspond to each other, the face verification 60 determines that the sensor 2 was operated by the driver.

The outputs from the hand verification 50 and the (optional) face verification 60 are then combined with the actual sensor result 41 which may indicate sufficient or insufficient physical condition of the driver. In response to determining, at 42, that all outputs are affirmative, i.e., the sensor indicates 41 a suitable physical condition, hand verification 50 indicates that the sensor 2 was operated by the driver, and/or face verification 60 indicates that the sensor 2 was operated by the driver (optional). The system determines that the vehicle is allowed to start 32. Otherwise, of one of the outputs is negative, the system prevents a vehicle start 33.

FIG. 10 provides a close-up into the sub-functionalities to realize the hand verification 50 of FIG. 9.

The hand detection and tracking module 16 generally corresponds to the localize and track hand functionalities 16 already described with reference to FIG. 4. This module comprises of an image processing algorithm that is arranged to detect (localize) hands in the image and track the detected hands over consecutive image frames (e.g. subsequent images taken by the cabin camera 3. In some embodiments, the hand detection and tracking module 16 utilizes a neural network model configured to detect bounding boxes of the hands using, for example, an object detection model architecture. In some embodiments, the hand detection and tracking module 16 is configured to classify a pose of a hand detected in the image (e.g. open palm, grabbing pose/holding object, pointing finger, etc).

The body tracking module 52 also uses of image processing techniques to detect (localize) characteristic body key points such as shoulders, hips, elbows, wrists, mouth corners, eye positions, ears, nose, finger tips, skeleton joints, hand points, or facial feature points of a human body. Body key points may be determined using a neural network. A body key point determination neural network may be a stand-alone neural network or, in some embodiments, may be part of a body recognition network which is utilized by an existing seat occupancy classification system of the vehicle. Furthermore, the body tracking module 52 groups the individual detections of body key points to a (respective) single person. The body tracking module 52 may further assigned the persons to predefined seat regions in the vehicle cabin. As a result, it can be determined which hands and body key points belong, for example and in particular, to the person in the driver seat of the vehicle. In some embodiments, the body tracking module 52 is configured to output either 2D (x,y image coordinates) or 3D (X,Y,Z) coordinates for the body key points in camera coordinates or vehicle coordinates.

The output of the modules 16 and 52 are further processed by a hand assignment module 53. This module utilizes e.g. a rule-based mechanism that combines the information from hand detection and tracking module 16 with the body tracking module 52. In some embodiments, the hand assignment module 53 is realized by computing a distance metric between hand detections (e.g. bounding boxes) and body key points (e.g. wrist points). In response to determining that the distance metric is within a (configurable) threshold, the boxes may be assigned to the same person and seat location as the key body point. The distance metric can be 2-dimensional or multi-dimensional, for example, taking into account depth information and/or scale or hand pose information for the assignment logic. The output hand assignment module 53 may be location information of one or two driver hands in 2D or 3D.

The sensor localization module 20 generally corresponds to functionality already described with reference to FIG. 5. The sensor localization module 20 utilizes image processing techniques to detect the sensor 2 in the cabin camera images. In some embodiments, the sensor localization module 20 includes an object detection module which is configured to localize the sensor 2 in terms of an object bounding box in the image. The object detector may be implemented by any suitable method that is capable of outputting bounding boxes and classifying objects, e.g., a machine learning classifier or the like. If the sensor 2 cannot be moved (its position in the vehicle cabin is fixed), the object detection module may be restricted to a vehicle geometry specific region of interest which reduces processing resources and time. In some embodiments, the position of the sensor 2 may be configurable based on the known cabin geometry and may be projected into the image using camera calibration parameters. These parameters may include extrinsic calibration, i.e. translation and rotation of the camera within a given vehicle reference coordinate system, and camera intrinsics, capturing the imaging properties of the optical path (e.g. focal length, optical center, distortion model parameters). The output of the sensor localization module 20 is a 2D or 3D location information of the sensor 2.

The hand-sensor proximity determination 21 generally corresponds to functionality already described with reference to FIG. 5. The hand-sensor proximity determination 21 utilizes e.g. a rule-based mechanism to combine the information from the hand assignment module 53 and the sensor localization 20. In some embodiments, a distance metric is computed between the driver's hand location information (output of module 53) and the sensor location information (output of module 20). In response to determining that the distance metric is below a (configurable) threshold, the hand is determined to be in proximity of the sensor 2. In some embodiments, tracking information (available from hand tracking functionality 16 across multiple image frames) is used to classify whether the sensor 2 and tracked hand movements are consistent during operation of the sensor 2. The output of the hand-sensor proximity module 21 may be a binary output (yes or no) indicating sufficient proximity or remoteness. In some embodiments, the output of the hand-sensor proximity module 21 may (additionally or alternatively) be a normalized value indicating a degree of proximity between hand and sensor 2.

The hand-to-driver-face proximity determination 55 utilizes e.g. a rule-based mechanism to combine the information from hand assignment module 53 and the driver's facial body key points of the body tracking module 52. In some embodiments when the sensor 2 is (also) operated by the mouth of the driver, e.g. a breath analyzer, a distance metric is computed between the hand location information and mouth location information indicating a location of the driver's mouth. In response to determining that the distance metric is below a (configurable) threshold, the hand is considered in proximity of the driver's mouth. Usage of hand-to-driver-face proximity determination 55 is optional and present/active if the sensor 2 is operated e.g. by blowing into the sensor, i.e. moving the sensor 2 close to the mouth of the driver or, vice versa, moving the mouth of the driver close to the sensor 2.

The seat occupancy classification 54 utilizes image processing mechanisms to classify the seat occupancy state for different seats in the cabin, wherein the state of the driver seat is particularly relevant. The seat occupancy classification 54 is arranged to distinguish, for example, an empty seat from a seat occupied by a person. The seat occupancy classification 54 is further able to distinguish adults and larger children from young children (e.g. 6 years or younger). For example, the seat occupancy classification 54 may determine objects in the image and assign objects a seat of the vehicle which, in turn, may comprise analyzing the image for detection of objects, a classification of object types and outputting bounding boxes for a detected object over time and a confidence value for the classification of the object type. The object types may comprise adult, child seat, child, animal, non-living object (e.g. a bag, a package, a backpack, a child seat, clothing, etc.), empty seat, etc.

The seat occupancy classification 54 may further contain a tracking mechanism to detect seat occupancy state changes, e.g. if the seat occupancy state changes from empty to person or person to empty. This facilitates a determination if a person in the driver seat has changed.

The hand verification functionalities 50 further include a sensor usage fusion module 56 which utilize e.g. a rule-based mechanism to detect if the sensor 2 is operated by the driver based on the information of the hand-to-sensor proximity 21 and the hand-to-face proximity 55 (optional, as described above). The sensor usage fusion module 56 also inputs the information from the sensor 2 itself indicating that the sensor 2 is being used or sensor operation has been started (received from the usage of sensor started 30 function shown by FIG. 9, i.e. arrow from usage of sensor started 30 may input the sensor fusion module 56 in the higher granularity representation of FIG. 10). In some embodiments, the sensor usage indication may also be provided as indirect signal by triggering the sensor localization 20 and hand-sensor proximity determination 21 upon start of sensor usage, i.e. the output of the hand-to-sensor proximity 21 triggers the sensor fusion 56. In embodiments, the sensor usage signal is directly provided as input to the sensor fusion module 56, and the sensor localization 20 and hand-to-sensor proximation determination 21 may be processed in the background and provide their input independently.

In some embodiments, the sensor fusion 56 is configured to keep the state as long as no state change in seat occupancy state is detected by the seat occupancy classification 54. At the time the ignition button 4 of the vehicle is pressed to start the vehicle, the output of the sensor fusion 56 is checked and combined with the detection sensor output in order to determine whether or not the vehicle is allowed to be started.

FIG. 11 provides a close-up into the sub-functionalities to realize the optional face verification 60 of FIG. 9. Face verification 60 is based on determining if the same face operates the sensor 2 and is associated with the driver. To this end, face verification 60 utilizes image processing techniques to detect (localize) and track 61 one or more faces in the one or more images taken by the cabin camera 3. The localized one or more faces may be tracked over consecutive image frames (e.g. subsequent images taken by the cabin camera 3. In some embodiments, the face detection and tracking module 61 utilizes a neural network model configured to detect bounding boxes of the faces using, for example, an object detection model architecture.

Face verification 60 further utilizes face recognition mechanisms to identify the one or more faces detected at 61. Two face recognition processes 62a, 62b may run in parallel. A first face recognition instance 62a may identify the face which is associated with the driver, i.e. the face of the person occupying the driving seat and having pressed the vehicle ignition button 4. As a result of the driver face recognition 62a, a driver face identifier (FaceID) may be determined at 63. A second face recognition instance 62b may, independently from driver face recognition 62a, identify the face which is associated with the person who operates the sensor 2. As a result of the sensor face recognition 62b, a sensor face identifier may be determined at 64. A face comparison 65 then input both face identifiers, the driver face identifier and the sensor face identifier, and compares both face identifiers. In response to determining that both face identifiers are identical, the face verification 60 determines that the sensor 2 is operated by the driver. In response to determining that both face identifiers are different, the face verification 60 determines that the sensor 2 is operated by another person than the driver.

Face identifiers may already be defined in memory of the vehicle for other purposes. Facial identification uses biometric recognition on persons' faces in the vehicle. With the help of face identification, a unique identifier may be associated with a person and with the biometric characteristics of this person. This enables e.g. to individually adapt the vehicle's features to the person, e.g., moving the driver's seat in the correct position, loading the driver's profile on a display in the vehicle, i.e., on the vehicle's infotainment system, or the like.

Both face recognition instances 62a, 62b may not necessarily run at the same due to different execution triggers. In some embodiments, the driver face recognition 62a is triggered by the ignition button pressed signal 40 (cf. FIG. 9, i.e. the arrow from box 40 to box 60 in FIG. 9 may be input to the driver recognition instance 62a in FIG. 11). In some embodiments, the sensor face recognition 62b is triggered by the usage of sensor started signal 30 (cf. FIG. 9, i.e. the arrow from box 30 to box 60 in FIG. 9 may be input to the sensor recognition instance 62b in FIG. 11). As both events, operation of the ignition button 4 and operation of the sensor, typically occur at different times (e.g. the driver may first operate the sensor 2 and afterwards press the ignition button 4), the face recognition instances 62a, 62b may be active at different (or overlapping) times and may also be based on different images or image frame sequences received from the cabin camera 3.

Figure 12:
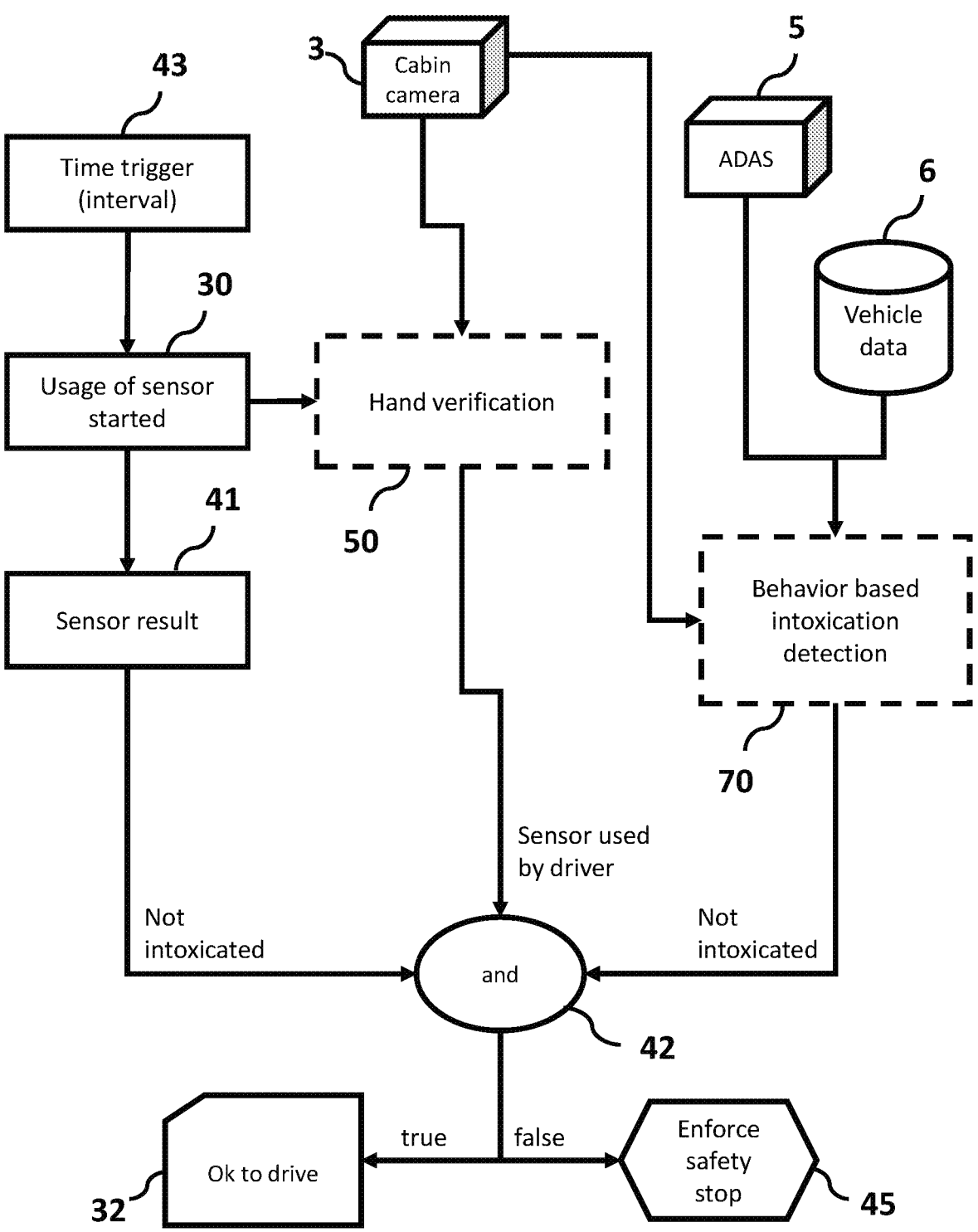
FIGS. 12 and 13 relate to functionalities used during vehicle ride.
Figure 13:
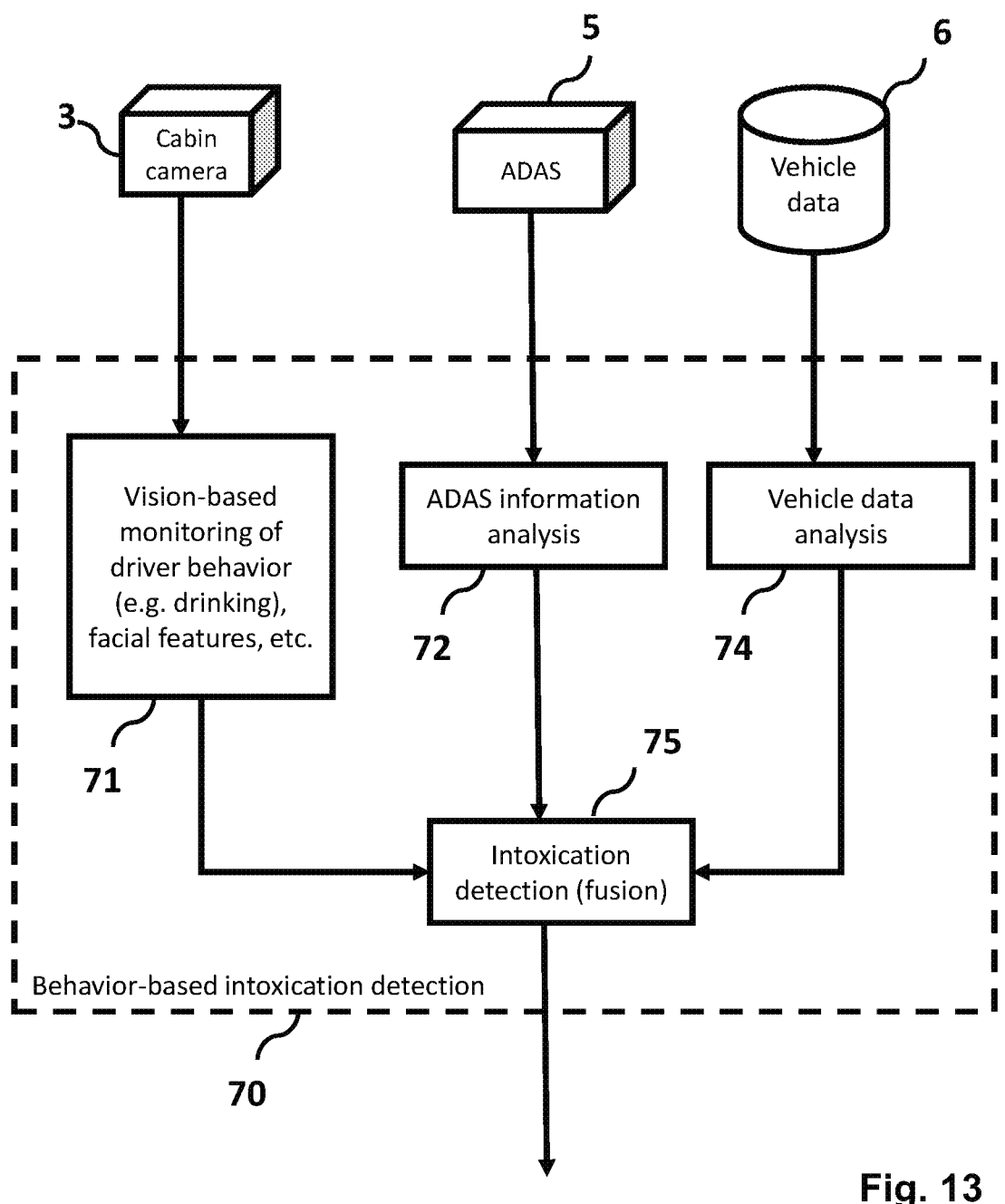

FIGS. 12 and 13 show an implementation example of a system for determining if the driver has operated the sensor 2 during vehicle ride. The overall system described herein may be implemented in different variants. In some embodiments, physical driver condition verification is performed at vehicle start, e.g. in response to detecting a vehicle start signal such as an operation of an ignition button 4. In some embodiments, physical driver condition verification is performed at vehicle start and additionally during vehicle ride, e.g. in periodic time intervals.

To realize the optional second phase of physical driver condition determination during vehicle ride, the interior sensing camera system 3 may be configured to periodically provide cabin images for image-based analysis. Generally, the driver may also be prompted to operate the sensor 2 during vehicle ride from time to time, e.g. in given periodic time intervals such as every hour. Sensor operation may be possible without vehicle stop, e.g. by way of a finger sensor. In some embodiments, sensor operation during vehicle ride may also necessitate a temporary vehicle stop, without however stopping the vehicle's engine. Verification mechanisms to determine if the sensor 2 is operated during vehicle ride by the driver may generally correspond to the mechanisms utilized before vehicle start, as described above with reference to FIGS. 1 to 11, such as assignment at least one hand to the driver, sensor localization, checking the proximity between the driver's hand and the sensor 2, and so on. Hence, these details are not repeated for the sake of brevity.

The image-based analysis during vehicle ride may examine the driver for signs of a deteriorating physical condition, such as an intoxication, including eye states (blinking, gaze dynamics, pupil diameter, etc.), body movements, driver activities during vehicle rides (e.g. drinking or smoking detection), object detection to locate objects in proximity to the driver (e.g. bottle, joint), and/or facial expressions. In some embodiments, alternatively or additionally, vehicle driving behavior is analyzed to assess the physical condition of the driver. Driving behaviors includes, for example, lane position and related dynamics (e.g. driving meandering), steering wheel dynamics, acceleration/deceleration dynamics, etc.

During the ride of the vehicle, both analyses (driver characteristics and driving characteristics) by run independently at different time intervals or time synchronized. In FIG. 12, both analyses are groups in behavior based intoxication detection 70. The driving characteristics analysis may be based on current vehicle data 6 (speed, acceleration, etc.) and data provided by an Advanced Driver Assistance System (ADAS, 5) of the vehicle such as lane position data. Further details are given by FIG. 13 which shows three main components of the behavior-based intoxication detection 70.

Based on images provided by the cabin camera 3, image processing techniques are utilized to analyze 71 the driver condition as well as the cabin environment surrounding the driver. On a stream of multiple images, analysis 71 may e.g. determine that the driver regularly drinks from a bottle next to him/her. Image recognition mechanisms may determine indications of an intoxications from the driver's eye state or facial expressions.

ADAS information analysis 72 may input data from the vehicle's ADAS 5 in order to analysis current vehicle control information such as driving lane precision. Regular failure to maintain the driving lane may be an indication of ineligible physical driver condition. Vehicle data analysis 74 may input current vehicle data 6 such as speed or acceleration. Abrupt speed changes may be an indication of ineligible physical driver condition.

The outputs of the three components 71, 72, 73 may be combined 75 (fused) in order to provide an aggregated output of the behavior-based intoxication detection 70. The aggregated output may indicate a likely intoxication or indicate not intoxicated (FIG. 12).

Referring back to FIG. 12, a trigger event such as periodic time trigger 43 may prompt the driver to operate the sensor 2. Start of sensor operation may output a signal 30 which has already been described above e.g. with reference to FIGS. 8 and 9. Usage of sensor started signal 30 may trigger the hand verification functionality 50 which corresponds to the hand verification functionality utilized before vehicle start (FIGS. 9 and 10). Hand verification 50 outputs if the sensor 2 was indeed operated by the driver. Both, the result of the sensor operation 41 as well as optional behavior-based intoxication detection 70 may indicate that the physical condition of the driver is appropriate for driving ("not intoxicated"). If all three input to combining/fusing module 42 are affirmative ("true"), the vehicle is allowed 32 to continue driving. Otherwise, if either the sensor result 41 or the behavior-based intoxication detection 70 indicate a lacking physical driver condition or the hand verification 50 indicates that the sensor 2 was not operated by the driver ("false"), a control signal is effected.

In some embodiments, the control signal enforces a safety stop 45 of the vehicle. In the event that sensor operation was performed during a temporary vehicle stop, the safety stop 45 may be enforced by turning off the vehicle engine. In the event that the vehicle is moving, the safety stop 45 may be enforced by gradually decelerating the vehicle and informing the driver about the vehicle stop, e.g. by an audio signal and/or visual signal. In some embodiments, instead of a safety stop, the control signal may be a (visual or audio) warning signal output to the driver. In some embodiments, the safety stop may be a cascade of warning messages to inform the driver a stop is required. If the warning messages are ignored, the system may gradually reduce the vehicle velocity, or—in a higher-level automated vehicle-fully take over the control of the vehicle operation and stop at the road side. In some embodiments, the control signal may also encompass a signal to a vehicle-external entity such as the police or a road monitoring system.

In addition, the present methodologies may feature the following add-ons and refinements: An in-cabin sensing system may be used to detect how many people are in the vehicle cabin. The in-cabin sensing system (cf. also FIG. 14) may include a number of cameras as well as, optionally, sensors for e.g. determining if a seat is occupied (e.g. weight sensors, seat belt monitoring). In response to determining that only one person is in the vehicle cabin, the result of the sensor analysis may be directly linked to the driver. The hand estimation functionalities of the present system are then utilized if the in-cabin sensing system determines that there are multiple persons in the vehicle cabin or next to the vehicle cabin (e.g. standing at the driver's door and thus visible in the images of the cabin camera 3).

A similar procedure may be performed if the in-cabin sensing system determines multiple persons in the vehicle cabin, but only one adult person, while the remaining persons are children. Depending on whether or not children are detected to be in the vehicle, in some embodiments, further children-related configurations may be applied. For example, a threshold of the sensor 2 may be adapted depending on a detected a number and age of persons in the vehicle. For example, if the driver is detected to be alone in the vehicle cabin, a higher sensor threshold might be applied, i.e. the requirements of the physical condition of the driver to allow vehicle operation are more relaxed (e.g. blood alcohol level threshold is 0.05%). However, if children are detected in the vehicle cabin, a lower sensor threshold may be applied to increase the safety level, i.e. the requirements for the physical condition of the driver to allow vehicle operation are set stricter (e.g. blood alcohol level threshold is 0.01%). In some embodiments, a presence of children in the vehicle cabin could also influence the warning/control strategy (FIG. 6, box 23; FIG. 12, box 45), e.g. stronger warning or control operation is applied or no option is given to the driver to manually overwrite the sensor result if a child or multiple children are detected in the vehicle cabin.

Furthermore, the system may feature an overriding module or confirmation module allowing for manual input. For example, if the in-cabin sensing system determines that there are multiple adults in the vehicle cabin, and the aforementioned functionalities determine that the sensor 2 was not operated by the driver and/or the driver's physical condition is inappropriate for driving, a person in the vehicle may be enabled to manually confirm that the sensor was in fact operated by the driver and/or that the driver is in appropriate physical condition, e.g. not intoxicated. Likewise, a block of vehicle start or control system during vehicle ride as described above may be overridden by such manual confirmation. The system may log such manual confirmation for documentation purposes and/or neural network learning purposes.

Figure 14:
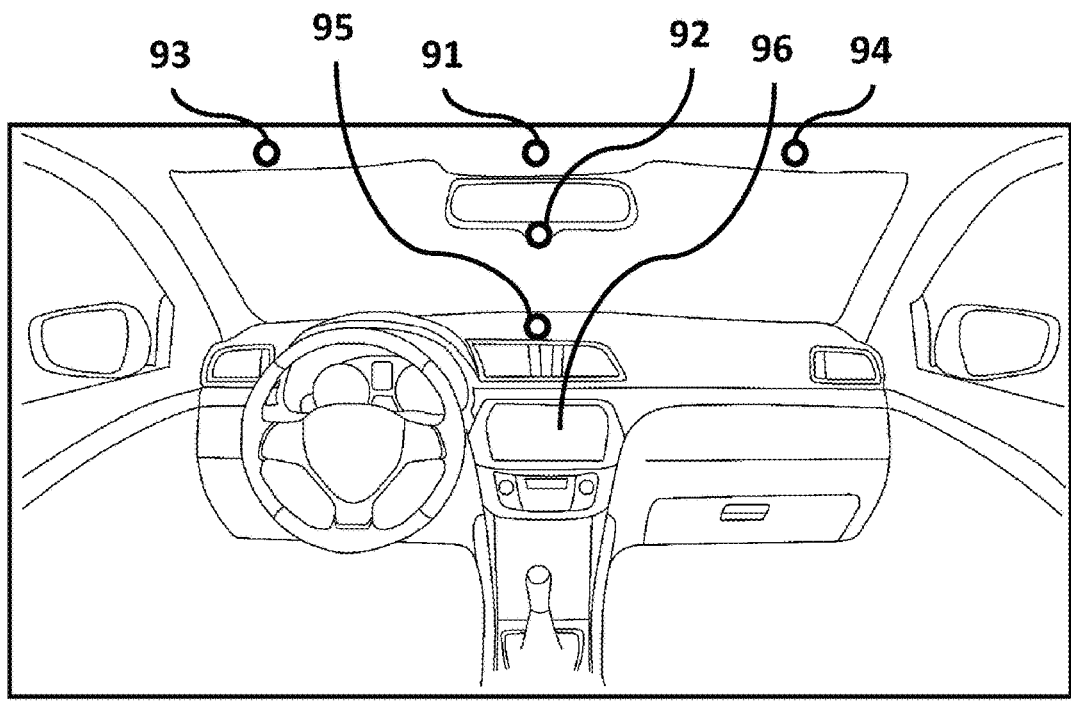
FIG. 14 shows an exemplary vehicle camera system.

FIG. 14 presents an interior of a vehicle with possible positions of cameras and a main display that may be used for capturing one or more images used for controlling one or more vehicle safety measures according to embodiments described herein.

The vehicle may comprise one camera, but also a plurality of cameras at different positions. The cameras, which may be color or monochrome cameras, infrared cameras, depth cameras, heat cameras, or a combination thereof, can be placed, e.g., in the middle over the front windshield and even over the rearview mirror as illustrated with position 91. Additionally or alternatively, a camera can be located below the rearview mirror as illustrated with position 92. If one camera is located at position 93, another one is typically also be located at position 94, but this is not mandatory. With two cameras, a depth image or 3D image may be created. Additionally or alternatively, a camera may be located the dashboard or in the middle console as depicted with position 95. Each of the positions 91 to 95 may also comprise two cameras co-located for enabling a 3D view of the interior of the vehicle.

Cameras may capture images, e.g., at regular time intervals or if trigged by an application that requires to determine a passenger's height or age as described herein. The applications using the images may be executed on the onboard computing system or at least in part executed remotely, e.g., in the cloud. The result of the application may not only output a control signal to a safety measure but also trigger a display on a vehicle's main display 96 at the middle console. The vehicle's main display may also be located in another position, e.g., at the dashboard behind the steering wheel.

As mentioned above, mechanisms described herein such as object detection, body key point determination, hand assignment, face analysis, and other image processing techniques may utilize machine learning methods such as one or multiple neural networks. The machine learning methods are trained on example images representing different classes such as object classes, hand poses, body poses, face expressions, etc. The machine learning methods may feature one or more of a gradient boosted tree, a random forest, an artificial neural network, a recurrent neural network, a convolutional neural network, an autoencoder, a deep learning architecture, a support vector machine, a data-driven trainable regression model, a k-nearest-neighbor classifier, a physical model, and/or a decision tree, or a combination thereof. The machine learning methods may be trained remotely before use of the vehicle and applied during use of the vehicle. The machine learning methods may also be retrained during use of the vehicle. Use of the vehicle is to be understood as anything that activates the power supply in the vehicle, i.e., unlocking the doors, approaching the vehicle with the key/ token for keyless entry systems, driving the vehicle, and the like.

FIG. 15 is a diagrammatic representation of internal components of a computing system 100 implementing the functionality as described herein. The computing system 100 may be located in the vehicle and includes at least one processor 101, a user interface 102, a network interface 103 and a main memory 106, that communicate with each other via a bus 105. Optionally, the computing system 100 may further include a static memory 107 and a disk-drive unit (not shown) that also communicate with each via the bus 105. A video display, an alpha-numeric input device and a cursor control device may be provided as examples of user interface 102.

Furthermore, the computing system 100 may also comprise a specified camera interface 104 to communicate with an onboard camera of the vehicle. Alternatively, the computing system 100 may communicate with the camera via the network interface 103. The camera is used for taking the image. The computing system 100 may also be connected to database systems (not shown) via the network interface, wherein the database systems store at least a subset of the images for providing the functionalities described herein.

The main memory 106 may be a random-access memory (RAM) and/or any further volatile memory. The main memory 106 may store program code implementing hand verification module 50, the face verification module 60, and the behavior-based physical condition analysis 70 which have been described above and which implement the methods described herein. Other modules utilizes for further functionalities described herein may be stored in the memory 106. The memory 106 may also store additional program data for providing the functionalities described herein. Part of the program code and program data may also be stored in a separate, e.g., cloud memory and executed at least in part remotely. In some embodiments, the memory 106 may store data such as the configurable thresholds utilized for proximity determination described herein in a cache 111.

According to an aspect, a vehicle is provided. The herein described methods may be stored as program codes or modules 50, 60, or 70 and may be at least in part included in the vehicle. Parts of the program codes 50, 60, 70 may also be stored and executed on a cloud server to reduce the computational effort on the vehicle's computing system 100. The vehicle may also comprise one or more cameras 3, e.g., connected via the camera interface 104, for capturing one or more images.

According to an aspect, a computer program comprising instructions is provided. These instructions, when the program is executed by a computer, cause the computer to carry out the methods described herein. The program code embodied in any of the systems described herein is capable of being individually or collectively distributed as a program product in a variety of different forms. In particular, the program code may be distributed using a computer readable storage medium having computer readable program instructions thereon for causing a processor to carry out aspects of the embodiments described herein.

Computer readable storage media, which are inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer.

A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

It should be appreciated that while particular embodiments and variations have been described herein, further modifications and alternatives will be apparent to persons skilled in the relevant arts. In particular, the examples are offered by way of illustrating the principles, and to provide a number of specific methods and arrangements for putting those principles into effect.

In certain embodiments, the functions and/or acts specified in the flowcharts, sequence diagrams, and/or block diagrams may be re-ordered, processed serially, and/or processed concurrently without departing from the scope of the disclosure. Moreover, any of the flowcharts, sequence diagrams, and/or block diagrams may include more or fewer blocks than those illustrated consistent with embodiments of the disclosure.

The terminology used herein is for the purpose of describing particular embodiments only and is not intended to be limiting of the embodiments of the disclosure. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "include", "having", "has", "with", "comprised of", or variants thereof are used in either the detailed description or the claims, such terms are intended to be inclusive in a manner similar to the term "comprising".

While a description of various embodiments has illustrated the method and while these embodiments have been described in considerable detail, it is not the intention of the applicants to restrict or in any way limit the scope of the appended claims to such detail. Additional advantages and modifications will readily appear to those skilled in the art. The disclosure in its broader aspects is therefore not limited to the specific details, representative apparatus and method, and illustrative examples shown and described. Accordingly, the described embodiments should be understood as being provided by way of example, for the purpose of teaching the general features and principles, but should not be understood as limiting the scope, which is as defined in the appended claims.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:
1. A computer-implemented method for determining a physical condition of a driver of a vehicle, the method comprising:
 receiving at least one image taken by a vehicle camera, the image showing at least a part of the driver and a sensor to be operated by the driver to determine the physical condition; and determining, based on the image, if the sensor is operated by the driver, including identifying the driver among multiple persons in the vehicle by:

classifying activities of the multiple persons;

assigning detected body parts to a respective one of the multiple persons; and providing a unique identifier for the respective one of the multiple persons, wherein the physical condition of the driver is determined based on an output of the sensor.

2. The method of claim 1 wherein determining if the sensor is operated by the driver includes:

localizing and tracking at least one hand of the driver; and determining that the sensor is operated by a hand of the driver.

3. The method of claim 2 wherein localizing and tracking the at least one hand of the driver includes, based on the at least one image:

tracking of bodies shown in the image;

tracking of hands shown in the image; and assigning, based on the tracked bodies and hands, the at least one hand to the driver.

4. The method of claim 2 wherein determining if the sensor is operated by a hand of the driver includes, based on the at least one image:

localizing the sensor; and determining a proximity of the hand of the driver to the sensor.

5. The method of claim 1 further comprising determining that the sensor is operated by a person other than the driver.

6. The method of claim 5 further comprising:

generating a warning signal; and/or triggering a control action to block or stop operation of the vehicle, wherein the control action includes:

effecting a safe stop of the vehicle; and/or prompting the driver to confirm current physical driving abilities.

7. The method of claim 1 further comprising:

determining, based on the at least one image, at least one of: eye states of the driver, body movements of the driver, hand operations of the driver, object detection in vicinity of the driver, or facial expressions of the driver.

8. The method of claim 7 wherein:

the body movements of the driver include drinking movements and/or smoking movements; and object detection in the vicinity of the driver includes detecting a vessel potentially containing liquid and/or detecting smoking products.

9. The method of claim 7 further comprising analyzing driving behavior including at least one of: lane position, driving meandering, steering wheel dynamics, or acceleration/deceleration dynamics.

10. The method of claim 1 wherein:

the method is performed before vehicle start; and the method further includes blocking the vehicle from being operated until usage of the sensor by the driver has been confirmed and sensor output has confirmed that the physical condition of the driver meets given conditions to operate the vehicle.

11. The method of claim 1 wherein:

the method is performed during operation of the vehicle; and the method further includes, in response to determining that the sensor is operated by the driver and a sensor output indicating that the physical condition of the driver is likely ineligible for driving, outputting a warning signal.

12. A system for controlling one or more vehicle safety measures, the system comprising:

memory hardware configured to store instructions; and processor hardware configured to execute the instructions, wherein the instructions include:

receiving at least one image taken by a camera of a vehicle, the image showing at least a part of a driver of the vehicle and a sensor to be operated by the driver to determine a physical condition of the driver; and determining, based on the image, if the sensor is operated by the driver, including identifying the driver among multiple persons in the vehicle by:

classifying activities of the multiple persons;

assigning detected body parts to a respective one of the multiple persons; and providing a unique identifier for the respective one of the multiple persons, wherein the physical condition of the driver is determined based at least on an output of the sensor.

13. A vehicle comprising:

a camera for capturing one or more images; and the system of claim 12.

14. A non-transitory computer-readable medium comprising instructions including:

receiving at least one image taken by a camera of a vehicle, the image showing at least a part of a driver of the vehicle and a sensor to be operated by the driver to determine a physical condition of the driver; and determining, based on the image, if the sensor is operated by the driver, including identifying the driver among multiple persons in the vehicle by:

classifying activities of the multiple persons;

assigning detected body parts to a respective one of the multiple persons; and providing a unique identifier for the respective one of the multiple persons, wherein the physical condition of the driver is determined based at least on an output of the sensor.

* * * * *